US011158174B2

(12) United States Patent
Olds et al.

(10) Patent No.: US 11,158,174 B2
(45) Date of Patent: Oct. 26, 2021

(54) SECURITY SYSTEM WITH DISTRIBUTED AUDIO AND VIDEO SOURCES

(71) Applicant: Carrier Corporation, Palm Beach Gardens, FL (US)

(72) Inventors: Scott Olds, Ladera Ranch, CA (US); Gabriel Daher, Long Point (AU); Stephen Connor, Irvine, CA (US)

(73) Assignee: CARRIER CORPORATION, Palm Beach Gardens, FL (US)

( * ) Notice: Subject to any disclaimer, the term of this patent is extended or adjusted under 35 U.S.C. 154(b) by 0 days.

(21) Appl. No.: 16/521,152

(22) Filed: Jul. 24, 2019

(65) Prior Publication Data
US 2021/0012643 A1    Jan. 14, 2021

Related U.S. Application Data

(60) Provisional application No. 62/873,769, filed on Jul. 12, 2019.

(51) Int. Cl.
*G08B 1/08*    (2006.01)
*G08B 13/16*    (2006.01)
(Continued)

(52) U.S. Cl.
CPC ..... *G08B 13/1672* (2013.01); *G08B 13/1681* (2013.01); *G08B 25/009* (2013.01);
(Continued)

(58) Field of Classification Search
CPC .............. G08B 25/009; G08B 13/1672; G08B 13/1681; G08B 25/08; H04R 1/02; H04W 4/80; H04W 84/042
See application file for complete search history.

(56) References Cited

U.S. PATENT DOCUMENTS 5,736,927 A    4/1998 Stebbins
6,504,479 B1 *    1/2003 Lemons ........... G08B 13/19645
340/541
(Continued)

FOREIGN PATENT DOCUMENTS

CN    201601789    10/2010
EP    1742186 B1    5/2008
(Continued)

OTHER PUBLICATIONS

US 10,277,609 B1, 04/2019, Dawes et al. (withdrawn)
(Continued)

*Primary Examiner* — Quang Pham
(74) *Attorney, Agent, or Firm* — Cantor Colburn LLP

(57) ABSTRACT

Disclosed is a hub station of an alarm system, having: a hub station housing; a hub station controller disposed within the hub station housing, wherein the hub station is configured for: monitoring, over a short range telecommunications network, a plurality of client stations that are distributed in a plurality of architectural zones, the plurality of client stations each including a client station housing and located therein a client station power transformer, a client station speaker, a client station microphone, and one of a plurality of client station controllers; determining, from the monitoring, that an alert condition exists in the one of the architectural zones; and establishing a first bidirectional communication concurrently with two or more of the plurality of client stations distributed in the plurality of architectural zones.

6 Claims, 8 Drawing Sheets

(51) Int. Cl.

| | |
|---|---|
| *H04R 1/02* | (2006.01) |
| *G08B 25/08* | (2006.01) |
| *H04W 4/80* | (2018.01) |
| *G08B 25/00* | (2006.01) |
| *H04W 84/04* | (2009.01) |

(52) U.S. Cl.
CPC .............. *G08B 25/08* (2013.01); *H04R 1/02* (2013.01); *H04W 4/80* (2018.02); *H04W 84/042* (2013.01)

(56) References Cited

U.S. PATENT DOCUMENTS

| | | | |
|---|---|---|---|
| 6,658,091 B1 * | 12/2003 | Naidoo | H04M 11/04 379/37 |
| 6,798,344 B2 * | 9/2004 | Faulkner | G08B 13/19656 340/541 |
| 6,922,145 B2 | 7/2005 | Piesinger | |
| 6,970,183 B1 * | 11/2005 | Monroe | G08B 7/062 348/143 |
| 6,975,220 B1 | 12/2005 | Foodman et al. | |
| 7,079,020 B2 | 7/2006 | Stilp | |
| 7,391,315 B2 | 6/2008 | Friar | |
| 7,486,271 B2 | 2/2009 | Hershkovitz et al. | |
| 7,532,114 B2 | 5/2009 | Stilp | |
| 7,616,115 B2 | 11/2009 | Horak et al. | |
| 7,629,880 B2 * | 12/2009 | Stilp | G08B 1/08 340/506 |
| 7,633,388 B2 | 12/2009 | Simon et al. | |
| 7,636,043 B2 | 12/2009 | Super | |
| 7,667,596 B2 | 2/2010 | Ozdemir | |
| 7,724,131 B2 | 5/2010 | Chen | |
| 7,830,750 B2 | 11/2010 | Smith | |
| 8,036,063 B2 | 10/2011 | Smith et al. | |
| 8,111,156 B2 | 2/2012 | Song et al. | |
| 8,265,776 B2 * | 9/2012 | Osann, Jr. | G08B 13/00 700/22 |
| 8,321,885 B2 * | 11/2012 | Pino, Jr. | H04N 21/4223 725/12 |
| 8,350,694 B1 * | 1/2013 | Trundle | G08B 13/00 340/539.11 |
| 8,354,929 B2 | 1/2013 | Herdie et al. | |
| 8,707,059 B2 | 4/2014 | Christianson et al. | |
| 8,707,075 B2 | 4/2014 | Broad et al. | |
| 8,723,665 B2 | 5/2014 | Foisy et al. | |
| 8,823,795 B1 * | 9/2014 | Scalisi | H04N 7/186 348/143 |
| 9,189,934 B2 | 11/2015 | Jentoft et al. | |
| 9,214,082 B2 | 12/2015 | Koenig et al. | |
| 9,251,692 B2 | 2/2016 | Reske | |
| 9,401,977 B1 * | 7/2016 | Gaw | G01V 8/10 |
| 9,600,987 B2 | 3/2017 | Jackson | |
| 9,601,001 B2 | 3/2017 | Matsuoka et al. | |
| 9,619,985 B2 | 4/2017 | Stricker et al. | |
| 9,651,649 B1 | 5/2017 | Salloum et al. | |
| 9,684,286 B2 | 6/2017 | Petricoin, Jr. | |
| 9,691,242 B1 | 6/2017 | Cohen et al. | |
| 9,711,036 B2 | 7/2017 | Fadell et al. | |
| 9,805,739 B2 | 10/2017 | Nongpiur et al. | |
| 9,812,001 B1 | 11/2017 | Grant | |
| 9,846,487 B2 * | 12/2017 | Divakara | G06F 3/0304 |
| 9,866,308 B1 | 1/2018 | Bultan et al. | |
| 9,921,309 B1 | 3/2018 | Skowronkek et al. | |
| 9,924,011 B2 * | 3/2018 | Lee | H04W 4/80 |
| 9,982,459 B2 | 5/2018 | Telljohann et al. | |
| 10,024,712 B2 | 7/2018 | Barjatia et al. | |
| 10,026,304 B2 | 7/2018 | Taylor et al. | |
| 10,069,890 B2 * | 9/2018 | Chen | H04L 41/5009 |
| 10,115,278 B2 | 10/2018 | Gordon et al. | |
| 10,163,329 B1 | 12/2018 | Jensen et al. | |
| 10,249,174 B2 | 4/2019 | El-Mankabady et al. | |
| 10,319,202 B2 | 6/2019 | Bau et al. | |
| 10,380,877 B2 * | 8/2019 | Davies | G08B 15/00 |
| 10,515,538 B2 | 12/2019 | Johan et al. | |
| 10,530,839 B2 * | 1/2020 | Kitchen | H04L 67/10 |
| 10,645,347 B2 * | 5/2020 | Ure | G08B 5/223 |
| 2003/0067387 A1 | 4/2003 | Kwon et al. | |
| 2004/0150519 A1 | 8/2004 | Husain et al. | |
| 2005/0038326 A1 | 2/2005 | Mathur | |
| 2005/0275528 A1 * | 12/2005 | Kates | H04W 52/0225 340/539.22 |
| 2006/0092011 A1 * | 5/2006 | Simon | G08B 13/19693 340/521 |
| 2006/0219473 A1 | 10/2006 | Boland et al. | |
| 2007/0183604 A1 | 8/2007 | Araki et al. | |
| 2008/0166992 A1 * | 7/2008 | Ricordi | A61B 5/0002 455/404.2 |
| 2008/0219100 A1 * | 9/2008 | Fisher | G01S 5/30 367/124 |
| 2008/0309449 A1 * | 12/2008 | Martin | G08B 25/14 340/3.1 |
| 2009/0016498 A1 | 1/2009 | Chen | |
| 2009/0028063 A1 | 1/2009 | Chang et al. | |
| 2009/0172131 A1 * | 7/2009 | Sullivan | H04M 3/5116 709/219 |
| 2009/0195382 A1 | 8/2009 | Hall | |
| 2009/0300525 A1 | 12/2009 | Jolliff et al. | |
| 2010/0008515 A1 * | 1/2010 | Fulton | H04R 3/005 381/92 |
| 2010/0097210 A1 * | 4/2010 | Tyroler | H04L 67/12 340/540 |
| 2010/0150026 A1 * | 6/2010 | Robins | H04W 40/24 370/254 |
| 2011/0074570 A1 * | 3/2011 | Feldstein | G08B 13/196 340/539.11 |
| 2011/0140868 A1 * | 6/2011 | Hovang | G08B 25/008 340/12.55 |
| 2012/0117268 A1 * | 5/2012 | Shaffer | H04L 29/06 709/238 |
| 2012/0275490 A1 * | 11/2012 | Courtice | H04W 40/246 375/133 |
| 2013/0002880 A1 * | 1/2013 | Levinson | G08B 25/016 348/159 |
| 2013/0033377 A1 * | 2/2013 | Hoseit | G08B 17/06 340/539.22 |
| 2013/0215902 A1 * | 8/2013 | Lamb | H04L 12/2836 370/401 |
| 2013/0321150 A1 * | 12/2013 | Koenig | G08B 25/08 340/541 |
| 2014/0084165 A1 * | 3/2014 | Fadell | H01H 9/02 250/340 |
| 2014/0094137 A1 * | 4/2014 | Gregory | H04W 4/029 455/404.2 |
| 2014/0225731 A1 * | 8/2014 | Gouveia | G08B 25/10 340/539.22 |
| 2014/0265568 A1 * | 9/2014 | Crafts | H05B 47/19 307/24 |
| 2014/0266669 A1 * | 9/2014 | Fadell | G08B 19/00 340/501 |
| 2014/0283144 A1 | 9/2014 | Gettings et al. | |
| 2014/0307096 A1 | 10/2014 | Park et al. | |
| 2015/0021465 A1 | 1/2015 | Gettings et al. | |
| 2015/0029022 A1 * | 1/2015 | Stebbins | G08B 25/00 340/517 |
| 2015/0029025 A1 * | 1/2015 | Kore | H04L 63/18 340/539.22 |
| 2015/0070166 A1 | 3/2015 | Boyden et al. | |
| 2015/0180986 A1 * | 6/2015 | Bisdikian | H04W 4/02 709/204 |
| 2015/0220214 A1 * | 8/2015 | Xue | G06F 3/0436 345/177 |
| 2015/0312050 A1 * | 10/2015 | Warren | G08B 13/19656 348/14.04 |
| 2015/0318015 A1 | 11/2015 | Bose et al. | |
| 2015/0339912 A1 | 11/2015 | Farrand et al. | |
| 2016/0044456 A1 * | 2/2016 | Lott | H04W 4/14 455/456.3 |
| 2016/0072891 A1 | 3/2016 | Joshi et al. | |
| 2016/0105406 A1 * | 4/2016 | Smith | H04W 60/00 713/171 |

(56) References Cited

U.S. PATENT DOCUMENTS

| | | | |
|---|---|---|---|
| 2016/0105423 A1* | 4/2016 | Logue | H04L 9/3268 726/10 |
| 2016/0105644 A1* | 4/2016 | Smith | H04N 5/232411 348/159 |
| 2016/0156676 A1 | 6/2016 | Vern et al. | |
| 2016/0216363 A1 | 7/2016 | Martin et al. | |
| 2016/0232774 A1* | 8/2016 | Noland | G08B 21/0438 |
| 2016/0240076 A1* | 8/2016 | Chua | G08B 25/009 |
| 2016/0267759 A1* | 9/2016 | Kerzner | G06T 19/006 |
| 2016/0269877 A1* | 9/2016 | Tang | H04W 4/80 |
| 2016/0351036 A1* | 12/2016 | Saldin | H04W 4/80 |
| 2017/0019744 A1 | 1/2017 | Matsumoto et al. | |
| 2017/0048495 A1* | 2/2017 | Scalisi | H04M 11/04 |
| 2017/0053520 A1 | 2/2017 | Cook et al. | |
| 2017/0084162 A1 | 3/2017 | Daher et al. | |
| 2017/0123038 A1* | 5/2017 | Griggs | G08B 29/188 |
| 2017/0169688 A1* | 6/2017 | Britt | G08B 21/0453 |
| 2017/0263092 A1 | 9/2017 | Rankin et al. | |
| 2017/0280109 A1* | 9/2017 | Scalisi | H04N 5/23296 |
| 2017/0345420 A1* | 11/2017 | Barnett, Jr. | G10L 15/22 |
| 2018/0054695 A1 | 2/2018 | Castor et al. | |
| 2018/0158295 A1 | 6/2018 | Acera et al. | |
| 2018/0183874 A1* | 6/2018 | Cook | H04L 41/0816 |
| 2018/0204432 A1* | 7/2018 | Phillips | H04L 67/12 |
| 2018/0293859 A1 | 10/2018 | Wilson et al. | |
| 2018/0308475 A1* | 10/2018 | Locke | G06F 40/279 |
| 2018/0322751 A1 | 11/2018 | Sacre et al. | |
| 2018/0335903 A1 | 11/2018 | Coffman et al. | |
| 2019/0026199 A1* | 1/2019 | Ramakrishnappa | H04L 45/22 |
| 2019/0044641 A1 | 2/2019 | Trundle et al. | |
| 2019/0108735 A1* | 4/2019 | Xu | G08B 13/19695 |
| 2019/0132396 A1* | 5/2019 | Finnegan | H04M 1/72415 |
| 2019/0228631 A1* | 7/2019 | Stinson | G06Q 10/06 |
| 2019/0311605 A1* | 10/2019 | Sakabayashi | H04M 11/04 |
| 2021/0012642 A1* | 1/2021 | Briscoe | G08B 13/1681 |

FOREIGN PATENT DOCUMENTS

| | | |
|---|---|---|
| EP | 1398744 B1 | 7/2012 |
| WO | 2013061268 A2 | 5/2013 |

OTHER PUBLICATIONS

Du et al., Architecture Design of Video Transmission between UMTS and WSN (Year: 2008).*

Kotus et at., Multimodal Surveillance Based Personal Protection System (Year: 2013).*

Ming et al., Research on Remote Intelligent Surveillance using Wireless Network (Year: 2006).*

Nazeran et al., A PDA-based flexible telecommunication system for telemedicine applications (Year: 2004).*

Pandian, Internet Protocol Based Store and Forward Wireless Telemedicine System for VSAT and Wireless Local Area Network (Year: 2007).*

Chatzimichail et al, Smart Interconnected INfrastructure for Security and Safety in Public Places (Year: 2019).*

Gu et al., A survey of indoor positioning systems for wireless personal networks (Year: 2009).*

Moreira et al., Sensor—Mobile Application to Monitor a WSN (Year: 2011).*

Singh et al., I Always Feel Like Somebody's Sensing Me! A Framework to Detect, Identify, and Localize ClandestineWireless Sensors (Year: 2020).*

Khan et al., Mobile Phone Sensing Systems A Survey (Year: 2013).*

Nadaf et al., Smart Mirror using Raspberry Pi as a Security and Vigilance System (Year: 2019).*

Nadaf et al., Smart Mirror Using Raspberry Pi for Human Monitoring and Intrusion Detection (Year: 2020).*

Sahoo et al., loT Based Intrusion Detection System Using PIR Sensor (Year: 2017).*

Sivakumar et al., Image Processing Based System for Intrusion Detection and Home Security Enhancement (Year: 2019).*

Aaron Carroll; An Analysis of Power Consumption in a Smartphone; Jun. 2010; Publisher: USENIXATC'10; Pertinent Pages: Whole document (Year: 2010).

ACM Website; Proceedings of the 2010 USENIX conference on USENIX annual technical conference; Captured Date:Aug. 26, 2020 (Year: 2020).

ISR/WO; PCT/US2020/041482; mailed Oct. 8, 2020; 13 pages.

ISR/WO; PCT/US2020/041483; mailed Oct. 8, 2020; 13 pages.

ISR/WO; PCT/US2020/041564; mailed Oct. 8, 2020; 13 pages.

Kevin Stratvert; Free baby monitor using Skype; Date: Jul. 20, 2018; Publisher: YouTube at URL: https://www.youtube.com/watch?v=eEbF_e9nleU; Captured on: Aug. 26, 2020; Pertinent sections: Entire Video (Year: 2018).

International Search Report; International Application No. PCT/US2020/041482; International Filing Date: Jul. 10, 2020; dated Oct. 8, 2020; 5 pages.

International Search Report; International Application No. PCT/US2020/041483; International Filing Date: Jul. 10, 2020; dated Oct. 8, 2020; 5 pages.

International Search Report; International Application No. PCT/US2020/041564; International Filing Date: Jul. 10, 2020; dated Oct. 8, 2020; 5 pages.

Written Opinion; International Application No. PCT/US2020/041482; International Filing Date: Jul. 10, 2020; dated Oct. 8, 2020; 8 pages.

Written Opinion; International Application No. PCT/US2020/041483; International Filing Date: Jul. 10, 2020; dated Oct. 8, 2020; 8 pages.

Written Opinion; International Application No. PCT/US2020/041564; International Filing Date: Jul. 10, 2020; dated Oct. 8, 2020; 8 pages.

* cited by examiner

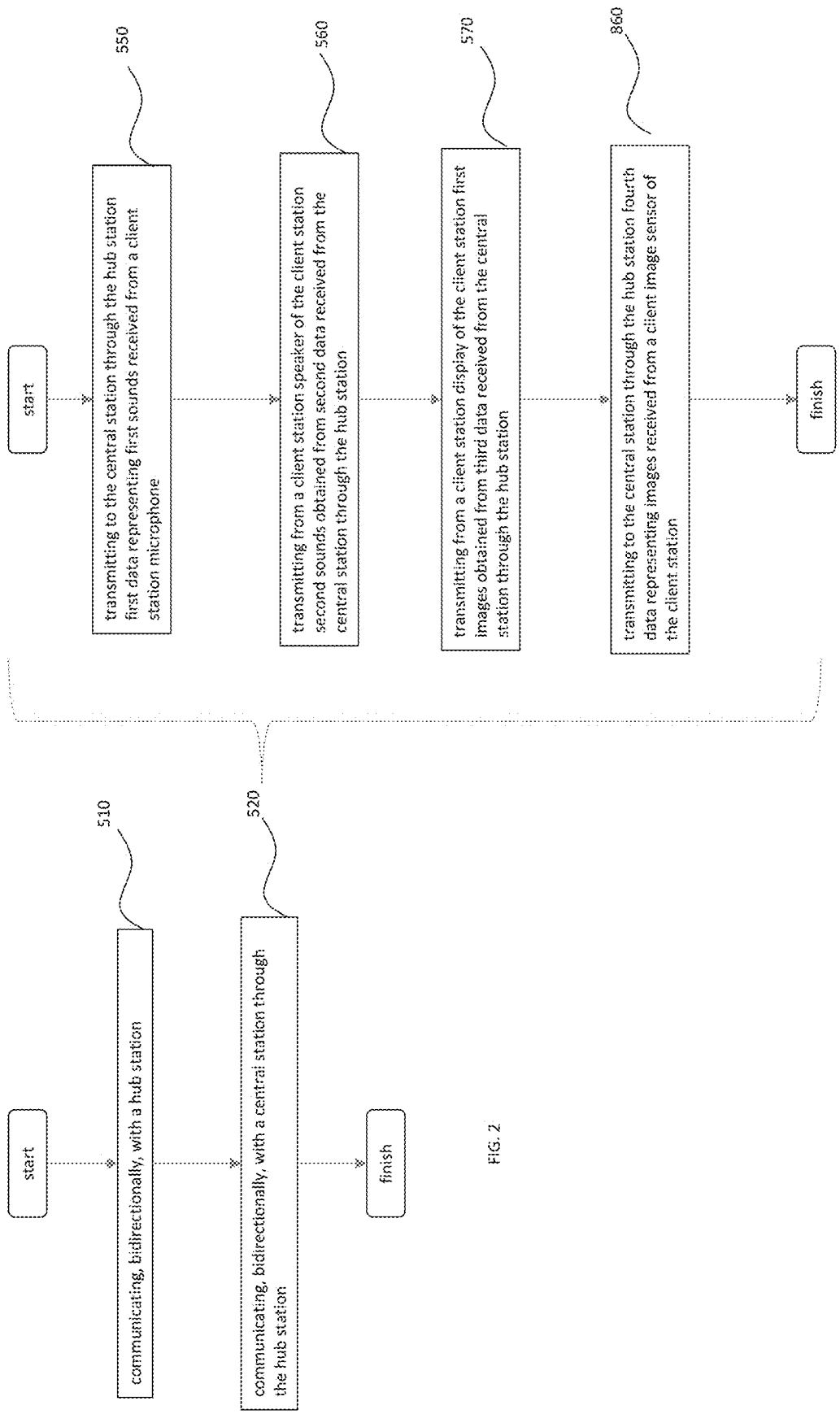

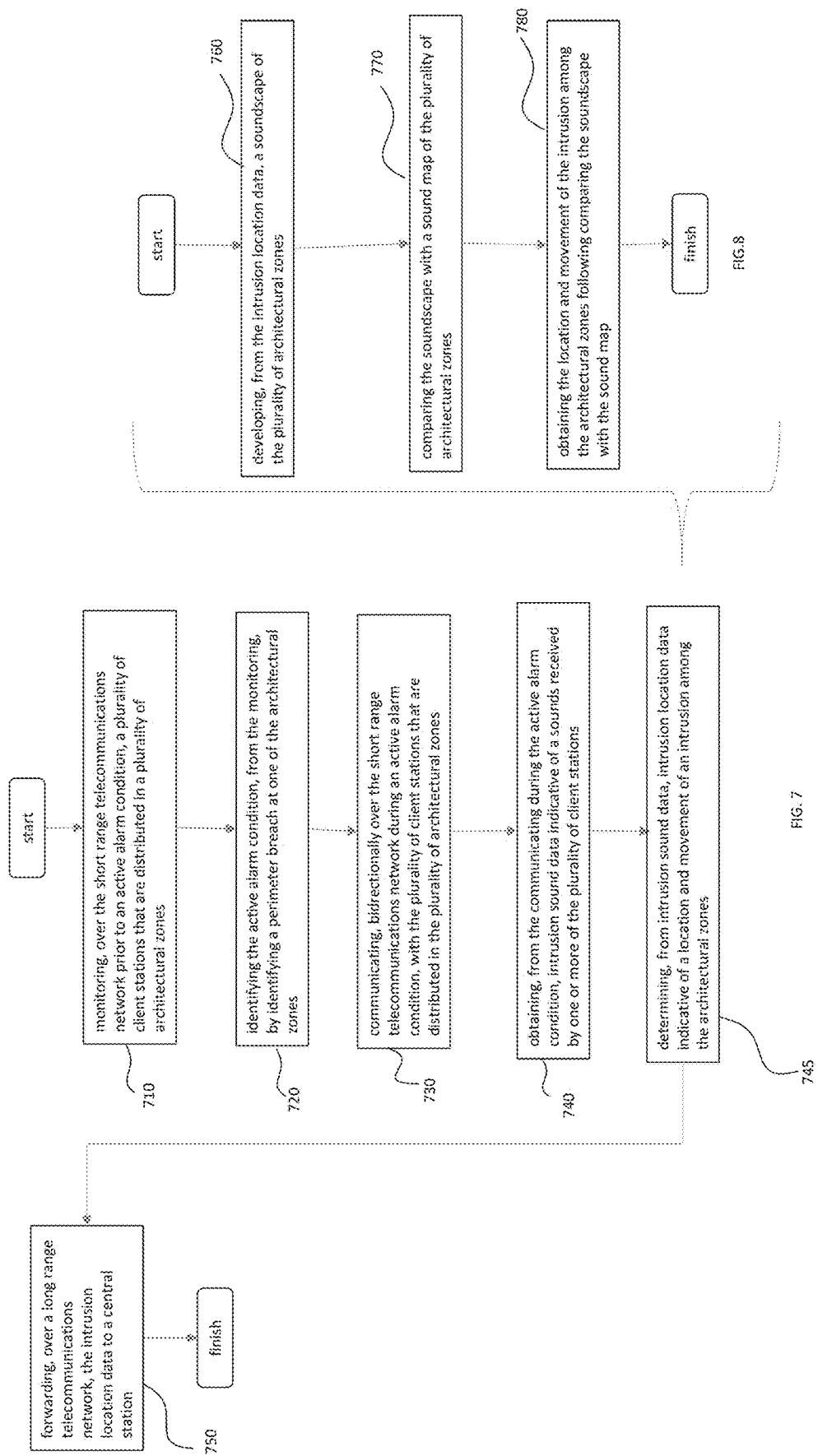

SECURITY SYSTEM WITH DISTRIBUTED AUDIO AND VIDEO SOURCES

BACKGROUND

The disclosed embodiments related to security systems and more specifically to a security system with distributed audio and video sources Single point two-way voice communication between alarm systems and central monitoring stations may reduce security systems false alarms, which may otherwise result in nuisance calls to the police that may lead to non-response or fines for home or business owners. Solution may include a microphone and speakers integrated into self-contained security panels, which may be small, which may have a reduced a range of communications, limited to a radius around the panels.

SUMMARY OF THE DISCLOSURE

Disclosed is a client station of an alarm system, including a housing and comprising, within the housing: a client station power transformer; a client station speaker; a client station microphone; a client station controller, wherein the client station is configured for: communicating, bi-directionally, with a hub station controller of a hub station over a short range telecommunications network; and communicating, bi-directionally, with a central station controller of a central station through the hub station.

In addition to one or more of the above disclosed aspects or as an alternate the short range telecommunications network is a local area network or a personal area network.

In addition to one or more of the above disclosed aspects or as an alternate the client station is configured for transmitting to the central station through the hub station first data representing first sounds received from the client microphone.

In addition to one or more of the above disclosed aspects or as an alternate the client station is configured for transmitting from the client speaker second sounds obtained from second data received from the central station through the hub station.

In addition to one or more of the above disclosed aspects or as an alternate, the client station includes a client station display screen integrated into the housing and operationally connected to the client station controller.

In addition to one or more of the above disclosed aspects or as an alternate the client station is configured for transmitting from the client station display first images obtained from third data received from the central station through the hub station.

In addition to one or more of the above disclosed aspects or as an alternate, the client station includes a client station image sensor integrated into the housing and operationally connected to the client station controller.

In addition to one or more of the above disclosed aspects or as an alternate the client station is configured for transmitting from the central station through the hub station fourth data representing second images obtained from the client station image sensor.

In addition to one or more of the above disclosed aspects or as an alternate the client station is configured for transmitting to the central station through the hub station the sixth data representing a location of the client station.

In addition to one or more of the above disclosed aspects or as an alternate, the client station includes an auxiliary power source within the housing and operationally connected to the client station controller.

In addition to one or more of the above disclosed aspects or as an alternate the auxiliary power source comprises batteries.

Disclosed is an alarm system comprising a client station having one or more of the above disclosed features; and a hub station configured to bi-directionally communicate with the client station over the short range telecommunications network and to bi-directionally communicate with a central station over the long range telecommunications network.

In addition to one or more of the above disclosed aspects or as an alternate, the long range telecommunications network is one or more Public Switched Telephone Networks (PTSN).

In addition to one or more of the above disclosed aspects or as an alternate, the system includes a hub station housing that includes a host controller, the host controller configured for receiving the first data from the client station representing first sounds received from the client station microphone and transmitting to the central station the first data.

In addition to one or more of the above disclosed aspects or as an alternate, hub station housing is speaker-less.

Disclosed is a method of monitoring for an alarm condition with a client station that includes a client station controller within a client station housing, the method comprising: communicating, bi-directionally, with a hub station over a wireless network that is a short range telecommunication network; and communicating, bi-directionally, with a central station through the hub station.

In addition to one or more of the above disclosed aspects or as an alternate, the method includes transmitting to the central station through the hub station first data representing first sounds received from a client station microphone of the client station, the client station microphone being operationally connected to the client station controller.

In addition to one or more of the above disclosed aspects or as an alternate, the method includes transmitting from a client station speaker of the client station second sounds obtained from second data received from the central station through the hub station, the client speaker being operationally connected to the client station controller.

In addition to one or more of the above disclosed aspects or as an alternate, the method includes transmitting from a client station display of the client station] first images obtained from third data received from the central station through the hub station, the client station display being operationally connected to the client station controller.

In addition to one or more of the above disclosed aspects or as an alternate, the method includes transmitting to the central station through the hub station fourth data representing images received from a client image sensor of the client station, the client station image sensor being operationally connected to the client station controller.

Disclosed is a hub station of an alarm system, comprising: a hub station housing; a hub station controller disposed within the hub station housing, wherein the hub station is configured for: monitoring, over a short range telecommunications network, a plurality of client stations that are distributed in a plurality of architectural zones, the plurality of client stations each including a client station housing and located therein a client station power transformer, a client station speaker, a client station microphone, and one of a plurality of client station controllers; determining, from the monitoring, that an alert condition exists in the one of the architectural zones; and establishing a first bidirectional communication concurrently with two or more of the plurality of client stations distributed in the plurality of architectural zones.

In addition to one or more of the above disclosed aspects or as an alternate the short range telecommunications network is a local area network or a personal area network.

In addition to one or more of the above disclosed aspects or as an alternate the hub station is configured for communicating, bi-directionally, with a central station over a long range telecommunications network.

In addition to one or more of the above disclosed aspects or as an alternate the long range telecommunications network is one or more Public Switched Telephone Networks (PTSN).

In addition to one or more of the above disclosed aspects or as an alternate, the hub station includes establishing a second bidirectional communication with the central station when establishing the first bidirectional communication upon determining that an alarm condition exists in one architectural zone.

In addition to one or more of the above disclosed aspects or as an alternate, the hub station includes establishing another bidirectional communication over the public communications network when establishing the first bidirectional communication and the second bidirectional communication.

In addition to one or more of the above disclosed aspects or as an alternate establishing the other bidirectional communication comprises establishing the other bidirectional communication with a mobile device.

In addition to one or more of the above disclosed aspects or as an alternate the mobile device is a mobile phone.

In addition to one or more of the above disclosed aspects or as an alternate, the host is configured to store contact information for establishing the other bidirectional communication upon determining that an alarm condition exists in one of the architectural zones.

In addition to one or more of the above disclosed aspects or as an alternate each of the bidirectional communications includes voice and image data.

Disclosed is an alarm system comprising a host station having one or more of the above disclosed aspects; a plurality of client stations that are configured for being distributed in a plurality of architectural zones, the plurality of client stations each including a client station housing and located therein a client station power transformer, a client station speaker, a client station microphone, and a client station controller.

Disclosed is a method of monitoring for an alarm condition with a hub station that includes a hub station controller within in a hub station housing, the method comprising: monitoring, over a short range telecommunications network, a plurality of client stations that are distributed in a plurality of architectural zones, the plurality of client stations each including a client station housing and located therein a client station power transformer, a client station speaker, a client station microphone, and one of a plurality of client station controllers; determining, from the monitoring, that an alert condition exists in one of the architectural zones; and establishing a first bidirectional communication over the short range telecommunications network with two or more of the plurality of client stations distributed in the plurality of architectural zones.

In addition to one or more of the above disclosed aspects or as an alternate the short range telecommunications network is a local area network or a personal area network.

In addition to one or more of the above disclosed aspects or as an alternate, the method includes establishing a second bidirectional communication with a central station when establishing the first bidirectional communication upon determining that an alarm condition exists in one of the architectural zones.

In addition to one or more of the above disclosed aspects or as an alternate establishing the second bidirectional communication comprises establishing the second bidirectional communication over one or more Public Switched Telephone Networks (PTSN).

In addition to one or more of the above disclosed aspects or as an alternate, the method includes establishing another bidirectional communication over a communications network that differs from the short range telecommunication network.

In addition to one or more of the above disclosed aspects or as an alternate establishing the other bidirectional communication comprises establishing the other bidirectional communication over one or more Public Switched Telephone Networks (PTSN).

In addition to one or more of the above disclosed aspects or as an alternate establishing the other bidirectional communication comprises establishing the other bidirectional communication with a mobile device.

In addition to one or more of the above disclosed aspects or as an alternate, the method includes accessing contact information stored locally at the hub station or remotely at the central station for establishing the other bidirectional communication upon determining that an alarm condition exists in one of the architectural zones.

In addition to one or more of the above disclosed aspects or as an alternate establishing each of the bidirectional communications includes transferring voice and image data.

Disclosed is a hub station of an alarm system, comprising: a hub station housing; a hub station controller disposed within the hub station housing, wherein the hub station is configured for: communicating, bi-directionally over a short range telecommunications network during an active alarm condition, with a plurality of client stations that are distributed in a plurality of architectural zones, the plurality of client stations each including a client station housing and located therein a client station power transformer, a client station speaker, a client station microphone, and one of a plurality of client station controllers; obtaining, from the communicating during the active alarm condition, intrusion sound data indicative of sounds received by one or more of the plurality of client stations; and determining, from the intrusion sound data, intrusion location data indicative of a location and movement of an intrusion among the architectural zones; and forwarding, over a long range telecommunications network, the intrusion location data to a central station.

In addition to one or more of the above disclosed aspects or as an alternate the short range telecommunications network is a local area network or a personal area network.

In addition to one or more of the above disclosed aspects or as an alternate the hub station is configured for communicating, bi-directionally, with the central station over the long range telecommunications network.

In addition to one or more of the above disclosed aspects or as an alternate, the long range telecommunications network is one or more Public Switched Telephone Networks (PTSN).

In addition to one or more of the above disclosed aspects or as an alternate, the hub station is configured for: developing, from the intrusion location data, a soundscape of the plurality of architectural zones; and obtaining from the soundscape the location and movement of the intrusion among the architectural zones.

In addition to one or more of the above disclosed aspects or as an alternate the hub station is configured for: comparing the soundscape with a sound map of the plurality of architectural zones; obtaining the location and movement of the intrusion among the architectural zones following comparing the soundscape with the sound map.

In addition to one or more of the above disclosed aspects or as an alternate the hub station is configured for calibrating the sound map of the plurality of architectural zones by: instructing one or more of the plurality of client stations to emit a test signal at a respective one or more predetermined times; and receiving from the others of the plurality of client stations data indicative of a detected sound levels during the one or more predetermined times.

In addition to one or more of the above disclosed aspects or as an alternate the hub station is configured for: associating the data indicative of the sound levels with a location within each of the architectural zones of the one or more of the plurality of client stations instructed to emit a test signal at a respective one or more predetermined times, thereby calibrating the sound map of the plurality of architectural zones.

In addition to one or more of the above disclosed aspects or as an alternate, the hub station is configured for calibrating the sound map automatically while the alarm system is in an armed-away state.

In addition to one or more of the above disclosed aspects or as an alternate the hub station is configured for: monitoring, over the short range telecommunications network prior to the active alarm condition, the plurality of client stations that are distributed in the plurality of architectural zones; and identifying the active alarm condition, from the monitoring, by identifying a perimeter breach at one of the architectural zones.

In addition to one or more of the above disclosed aspects or as an alternate, the hub station is configured for identifying the perimeter breach by identifying a fault condition with one or more of a glass break sensor, a window contact sensor, a door contact sensor, and a perimeter motion sensor, thereby initially identifying the active alarm condition.

Disclosed is an host system comprising a host station having one or more of the above disclosed aspects; a plurality of client stations that are configured for being distributed in a plurality of architectural zones, the plurality of client stations each including a client station housing and located therein a client station power transformer, a client station speaker, a client station microphone, and a client station controller.

Disclosed is a method of monitoring for an alarm condition with a hub station that includes a hub station controller within a hub station housing, the method comprising: communicating, bi-directionally over a short range telecommunications network during an active alarm condition, with a plurality of client stations that are distributed in a plurality of architectural zones, the plurality of client stations each including a client station housing and located therein a client station power transformer, a client station speaker, a client station microphone, and one of a plurality of client station controllers; obtaining, from the communicating during the active alarm condition, intrusion data indicative of a location and movement of an intrusion among the architectural zones; and forwarding, over a long range telecommunications network, the intrusion data to a central station.

In addition to one or more of the above disclosed aspects or as an alternate, the method includes developing, from the intrusion data, a soundscape of the plurality of architectural zones; and obtaining from the soundscape the location and movement of the intrusion among the architectural zones.

In addition to one or more of the above disclosed aspects or as an alternate, the method includes comparing the soundscape with a sound map of the plurality of architectural zones; obtaining the location and movement of the intrusion among the architectural zones following comparing the soundscape with the sound map.

In addition to one or more of the above disclosed aspects or as an alternate, the method includes calibrating the sound map of the plurality of architectural zones by: instructing one or more of the plurality of client stations to emit a test signal at a respective one or more predetermined times; and receiving from the others of the plurality of client stations data indicative of a detected sound levels during the one or more predetermined times.

In addition to one or more of the above disclosed aspects or as an alternate, the method includes associating the data indicative of the sound levels with a location within each of the architectural zones of the one or more of the plurality of client stations instructed to emit a test signal at a respective one or more predetermined times, thereby calibrating the sound map of the plurality of architectural zones.

In addition to one or more of the above disclosed aspects or as an alternate, the method includes calibrating the sound map automatically while the alarm system is in an armed-away status.

In addition to one or more of the above disclosed aspects or as an alternate, the method includes monitoring, over the short range telecommunications network prior to the active alarm condition, the plurality of client stations that are distributed in the plurality of architectural zones; and identifying the active alarm condition, from the monitoring, by identifying a perimeter breach at one of the architectural zones.

In addition to one or more of the above disclosed aspects or as an alternate, the method includes identifying the perimeter breach by identifying a fault condition with one or more of a glass break sensor, a window contact sensor, a door contact sensor, and a perimeter motion sensor.

BRIEF DESCRIPTION OF THE DRAWINGS

The present disclosure is illustrated by way of example and not limited in the accompanying figures in which like reference numerals indicate similar elements.

FIG. 2 is a flow chart illustrating a method of monitoring for an alarm condition according to the embodiment illustrated in FIG. 1;

FIG. 3 is another flow chart illustrating additional aspects of the method of FIG. 2;

FIG. 7 is a flow chart illustrating a method of monitoring for an alarm condition according to the embodiment illustrated in FIG. 6;

FIG. 8 is another flow chart illustrating aspects of a method of monitoring for an alarm condition according to the embodiment illustrated in FIG. 6;

DETAILED DESCRIPTION

Figure 1:
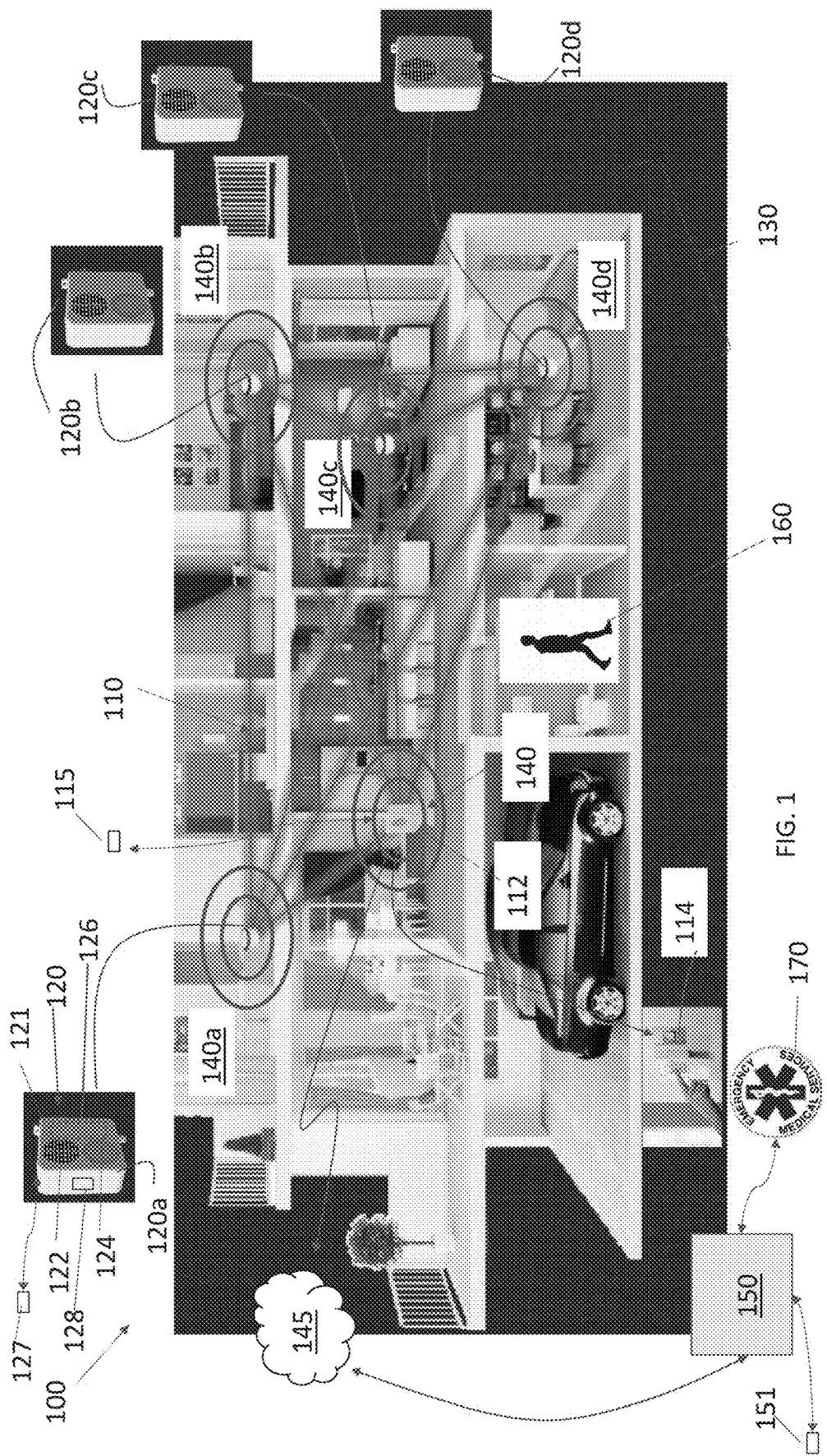
FIG. 1 shows a plurality of alarm stations distributed in a respective plurality of zones connected over a network in an installation area.

Turning to FIG. 1, the disclosed embodiments provide a security system (system) 100 that enables wireless communicating two-way (bidirectional) voice, by a network 110, which may be a short range network such as a local area network (such as WiFi) or a personal area network (such as Bluetooth). The system 100 may include a hub station 112 having a hub station housing 113, a control panel 114 for the hub station 112 with a hub station electronic controller 115 therein (illustrated schematically). A plurality of client stations 120 are provided, for example four such client stations 120a-120d are identified in FIG. 1. Such client stations 120 are provided throughout an installation area 130. Each of the client stations 120 includes within one of a plurality of client station housings 121, one of a plurality of client station speakers 122, one of a plurality of client station microphones 124, one of a plurality of client station transformers 126 (illustrated schematically) and one of a plurality of client station controllers 127 (illustrated schematically).

The system 100 provides communications (bidirectional) between the system 100 and a central station 150, via a central station controller 151 (illustrated schematically), that is remotely located over a further network 145 which may be a long range network such as a wide area network distributed over the Public Switched Telephone Networks (PTSN). The client stations 120 may be distributed throughout architectural zones (zones) 140, including for example four distributed zones 140a-140d of the installation area 130, that are in addition to a primary zone at the hub station 112. The installation area 130 maybe a private residence and the zones 140 may be separate rooms and/or on multiple levels therein.

There are typically packaging limitations at a hub station 112. By packaging the client station speakers 122 and client station microphones 124 with the client station transformers 126 at the client station housings 121, such limitations are avoided. Instead larger and more powerful speakers and microphones for the client station speakers 122 and the client station microphones 124 may be utilized. This configuration may provide a larger communication range at the client stations 120. In some embodiments the client stations 120 may include video displays 128 and may be capable of video capture.

The system 100 provides a relatively enhanced communication range. The client stations 120 are configured to annunciate programmable status messages, such as "front door open", throughout the installation area 130. The status messages provide an understanding of a state of the security system to a system user 160, whom may be a homeowner.

FIG. 2 is a flowchart illustrating a method of monitoring for an alarm condition with the client stations 120. As illustrated in box 510 the method includes communicating, bi-directionally, with the hub station 112. As illustrated in box 520 the method includes communicating, bi-directionally, with the central station 150 through the hub station 112.

FIG. 3 is a flowchart illustrated further aspects of the method of FIG. 2 more specifically of communicating, bi-directionally, with the central station 150 through the hub station 112. As illustrated in box 550 the method includes transmitting to the central station 150 through the hub station 112 first data representing first sounds received from a client station microphones 124. As illustrated in box 560 the method includes transmitting from the client station speakers 122 second sounds obtained from second data received from the central station 150 through the hub station 112. As illustrated in box 570 the method includes transmitting from a client station display first images obtained from third data received from the central station 150 through the hub station 112. As illustrated in box 570 the method includes transmitting to the central station 150 through the hub station 112 fourth data representing images received from a client image sensor of the client stations 120.

With the above disclosed embodiments, a hub station 112 may communicate with an array of client stations 120. This configuration may enable voice, and for example video, communications from multiple zones 140 within an installation area 130. This provides capabilities such as being able to triangulate sound source location within or proximate one of the zones 140. During an emergency, such a location could be provided to medical services 170 and other first responders via the central station 150.

Figure 4:
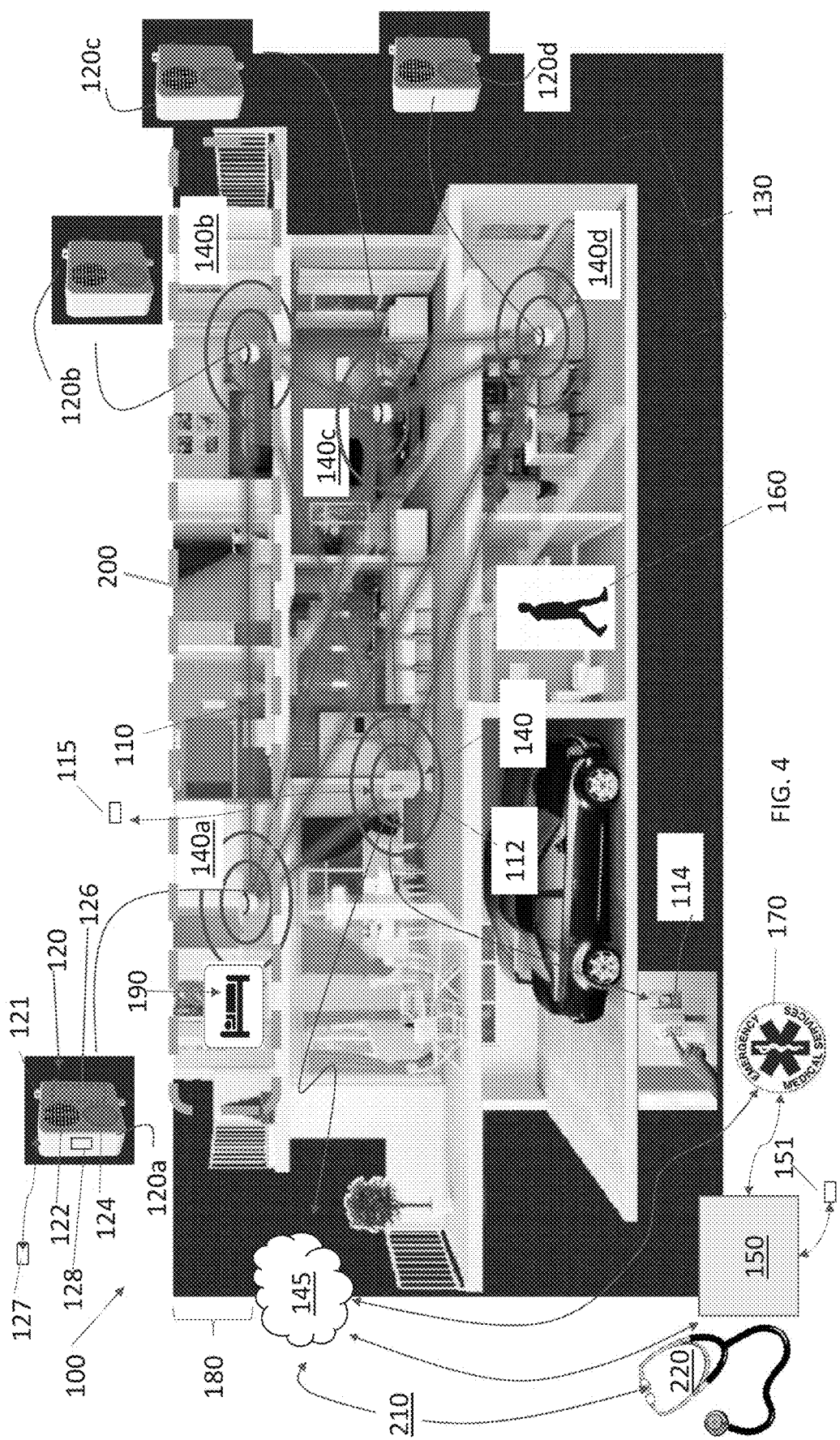
FIG. 4 shows the plurality of alarm stations distributed in the respective plurality of zones in the installation area, wherein the alarm stations are activated to for two-way communication.

Turning to FIG. 4, the disclosed embodiments pool communications for a group 200 of two or more of the plurality of the client stations 120 during an alarm condition. The group 200 can be collectively assessed by the control panel 114, for example as one collective audio/video channel. In the illustrated embodiment the group 200 includes a first client station 120a and a second client station 120b of the plurality of client stations 120, respectively located in a first zone 140a and a second zone 140b of the plurality of zones 140. In the illustration, these zones 140a, 140b are located on a common level 180 of the installation area 130. The common level 180 may be a level in which a particular person 190, such as an infirmed person, spends their time and where such person would need to be addressed during and alarm condition.

Additionally, according to an embodiment, external communication routes 210 may be communicatively connected to the group 200 by the system 100 through the network 145 by action of the control panel 114. Such sources may be provided with networked two-way audio and video capabilities. For example, if the system detects that a personal panic alarm has sounded in one zone, electronic contact addresses, which may be phone numbers, stored in the system 100 for example at the control panel 114, may be automatically contacted by the control panel 114 and bridged into the network 110 to the client stations 120 in the group 200. Applications of the disclosed embodiments includes automatically bridging a doctor 220 via the external communication routes 210, or in addition or as an alternative, members of a family whom are remotely located. In addition, medical services 170 may be bridged to the grouped stations. That is, in addition to be summoned by the central station 150, medical services 170 may be connected over the network 145 for direct two way communications with the client stations 120 in the group 200. Two way voice, and in one embodiment video, communications may be enabled by the system with the connected family members and emergency service personnel. In addition, such two way communications may include personnel at the central station 150 so required efforts are coordinated.

Figure 5:
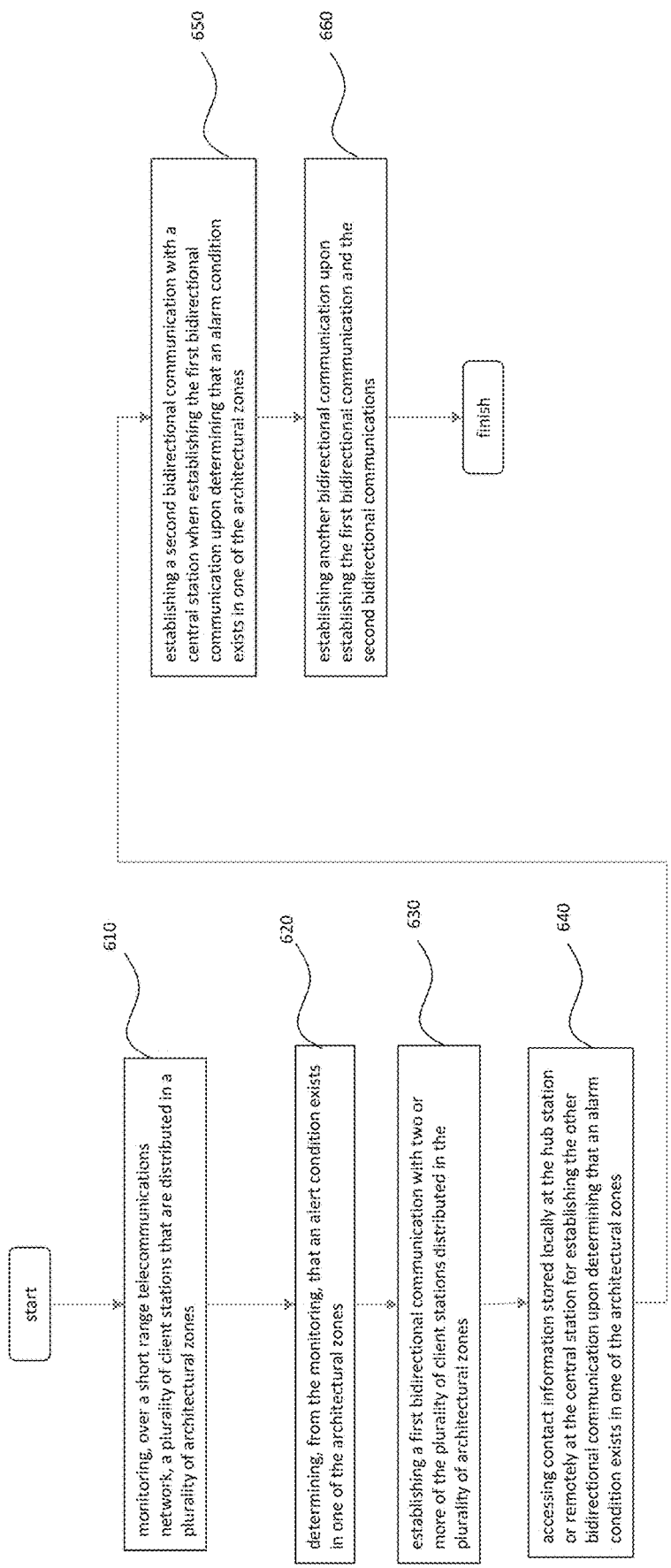
FIG. 5 is a flow chart illustrating additional aspects method of monitoring for an alarm condition according to the embodiment illustrated in FIG. 4.

Turning to FIG. 5, a flowchart that shows a method of monitoring for an alarm condition by the host station according to an embodiment. As illustrated in box 610 the method includes monitoring, over a short range telecommunications network, the plurality of client stations 120 that are distributed in the plurality of zones 140. As illustrated in box 620 the method includes determining, from the monitoring, that an alert condition exists in one of the zones 140. As illustrated in box 630 the method includes establishing a first bidirectional communication with two or more of the plurality of client stations 120 distributed in the plurality of zones 140. As illustrated in box 640 the method includes accessing contact information stored locally at the hub station or remotely at the central station 150 for establishing the other bidirectional communication upon determining that an alarm condition exists in one of the zones 140. As illustrated in box 650 the method includes establishing a second bidirectional communication with a central station 150 when establishing the first bidirectional communication upon determining that an alarm condition exists in one of the zones 140. As illustrated in box 660 the method includes establishing another bidirectional communication upon establishing the first bidirectional communication and the second bidirectional communications.

Benefits of the disclosed embodiments include coalescing audio and/or video access points at the client stations 120 of the group 200 enables enhanced coverage for two-way communications with a central station 150. According to the disclosed embodiments, the control panel 114 may store contact addresses for the external communication routes 210 to be automatically connected to the client stations 120 that are in the group 200. Thus, desired persons and resources may be automatically contacted in the event of an emergency.

Figure 6:
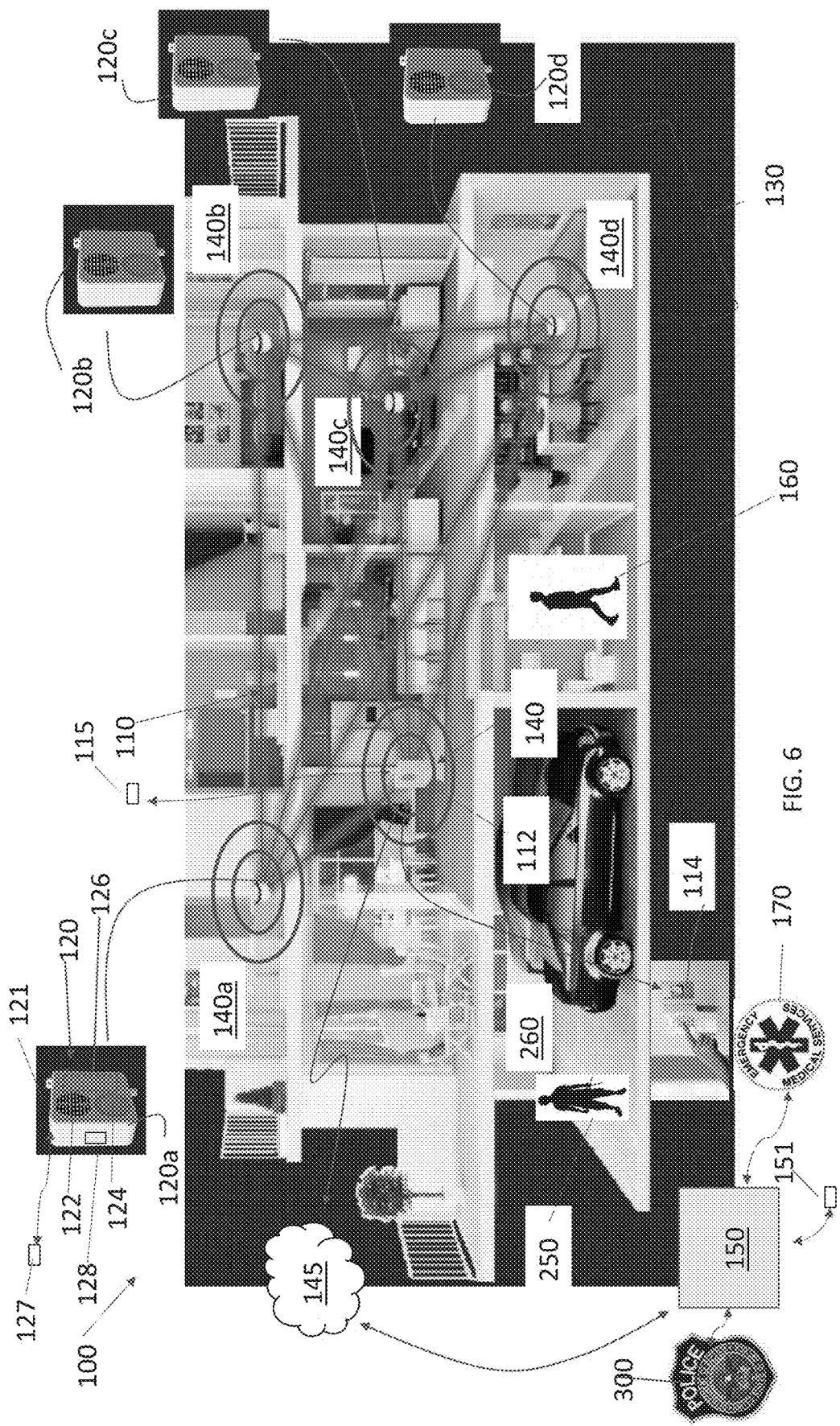
FIG. 6 shows the plurality of alarm stations distributed in the respective plurality of zones in the installation area, wherein the alarm stations are activated to identify a location of an alarm condition.

Turning to FIG. 6, the disclosed embodiments provide for storing information about the different zones 140 for the plurality of client stations 120 to assess various audio signal characteristics. The disclosed embodiments enable determining where in the installation area 130 an alarm condition, such as a sound source by action of an intruder 250, is being detected. For example, an initial alarm condition may be detecting an intrusion at a door-window sensor, for example in one of the zones 140 proximate a level 260 that is associated with a garage. Thereafter, the system 100 may monitor for movement of the intruder 250 by monitoring audio signals at each of the plurality of client stations 120. Through monitoring of audio characteristics such as changing frequency and amplitude of sounds at or proximate the plurality of client stations 120, the system 100 may determine that a source of a dominant sound, such as the intruder 250, is moving between client stations 120 and therefore moving between zones 140 in the installation area 130.

Benefits of the disclosed embodiments include enabling the central station 150 to track a developing alarm condition in an installation area 130 and relay such information, for example to law enforcement agencies 300 over the network 145. The same information may be utilized to identify location of medical distress within one of the zones 140 in the installation area 130, thereby enabling the central station 150 to communicate with medical services 170 and identify a specific location of a need within the installation area 130.

FIG. 7 shows a flowchart that shows a method of monitoring for an alarm condition by the host station according to an embodiment. As illustrated in box 710 the method includes monitoring, over the short range telecommunications network prior to an active alarm condition, the plurality of client stations 120 that are distributed in the plurality of zones 140. As illustrated in box 720 the method includes identifying the active alarm condition, from the monitoring, by identifying a perimeter breach at one of the zones 140. As illustrated in box 730 the method includes communicating, bi-directionally over the short range telecommunications network during an active alarm condition, with the plurality of client stations 120 that are distributed in the plurality of zones 140. As illustrated in box 740 the method includes obtaining, from the communicating during the active alarm condition, intrusion sound data indicative of a sounds received by one or more of the plurality of client stations 120. As illustrated in box 745 the method includes determining, from intrusion sound data, intrusion location data indicative of a location and movement of an intrusion among the zones 140. As illustrated in box 750 the method includes forwarding, over a long range telecommunications network, the intrusion data to a central station 150.

FIG. 8 is a flowchart that shows additional aspects of the method illustrated in FIG. 7 and more specifically of determining, from intrusion sound data, intrusion location data. As illustrated in box 760 the method includes developing, from the intrusion sound data, a soundscape of the plurality of zones 140. As illustrated in box 770 the method includes comparing the soundscape with a sound map of the plurality of zones 140. As illustrated in box 780 the method includes obtaining the location and movement of the intrusion among the zones 140 following comparing the soundscape with the sound map.

Figure 9:
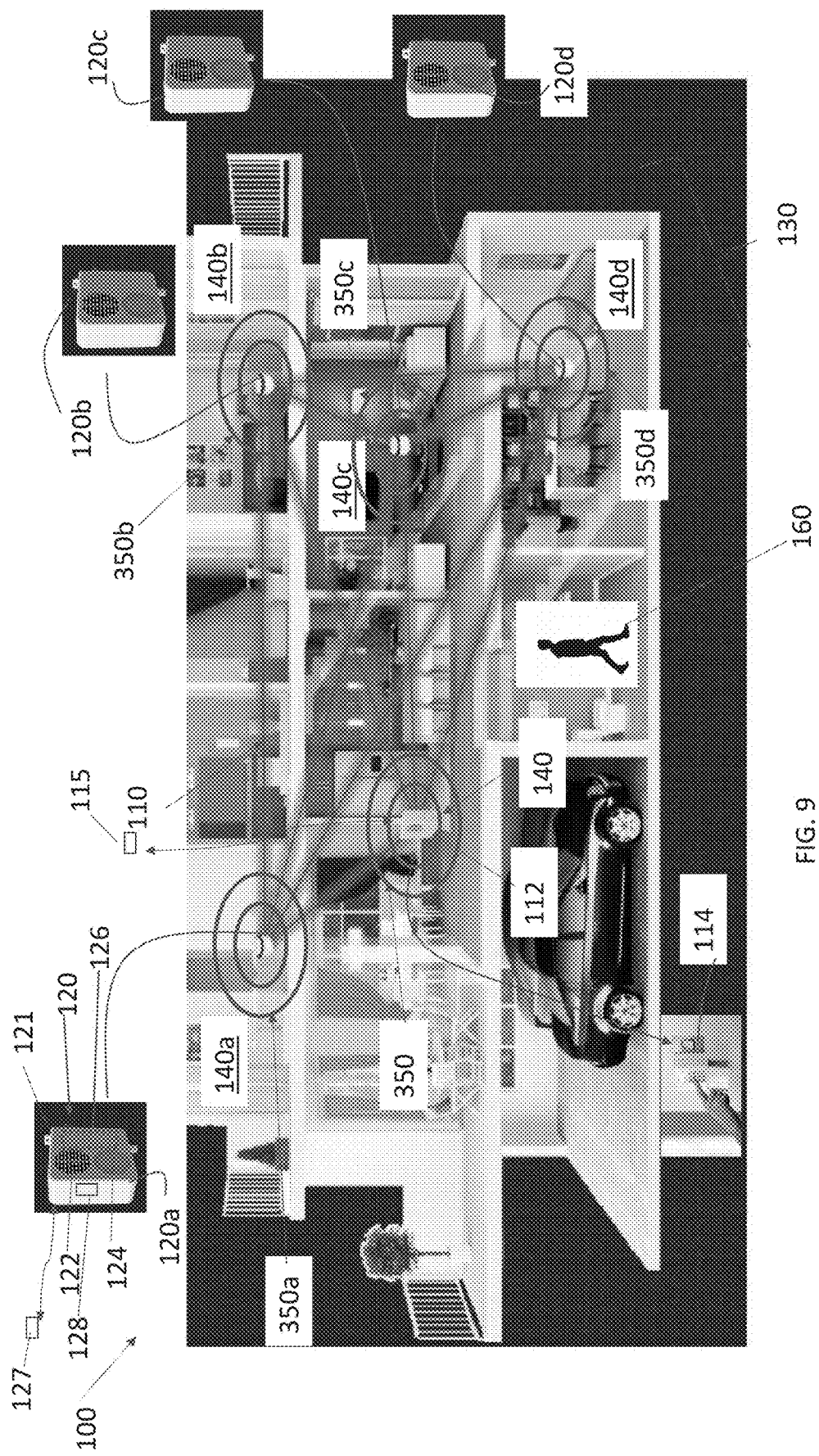
FIG. 9 shows the plurality of alarm stations distributed in the respective plurality of zones in the installation area, wherein the alarm stations are activated to execute a calibration process.

Turning to FIG. 9, the disclosed embodiments provide a process for calibrating the system 100 by applying test tones, though each of the plurality of client stations 120, and mapping audio qualities and characterization within and around each of the plurality of zones 140. This process allows for a better understanding of nuances of sound propagation and sound characteristics in and around each of the zones 140 of the installation area 130. The calibration process may occur, for example, manually and periodically when the system is activated. During calibration, each of the plurality of client stations 120, one after another, may emit one of a plurality of a test tones 350, including for example four sets of test tones 350a-350d respectively from the plurality of client stations 120. The hub station 112 may also emit one of the test tones 350. Though this calibration process, the control panel 114 may develop a tonal map for the installation area 130 and within for each of the zones 140, which may later be used to identify a souse of an alert condition (as indicated above). In addition, through the calibration process, a performance of the system is optimized.

Figure 10:
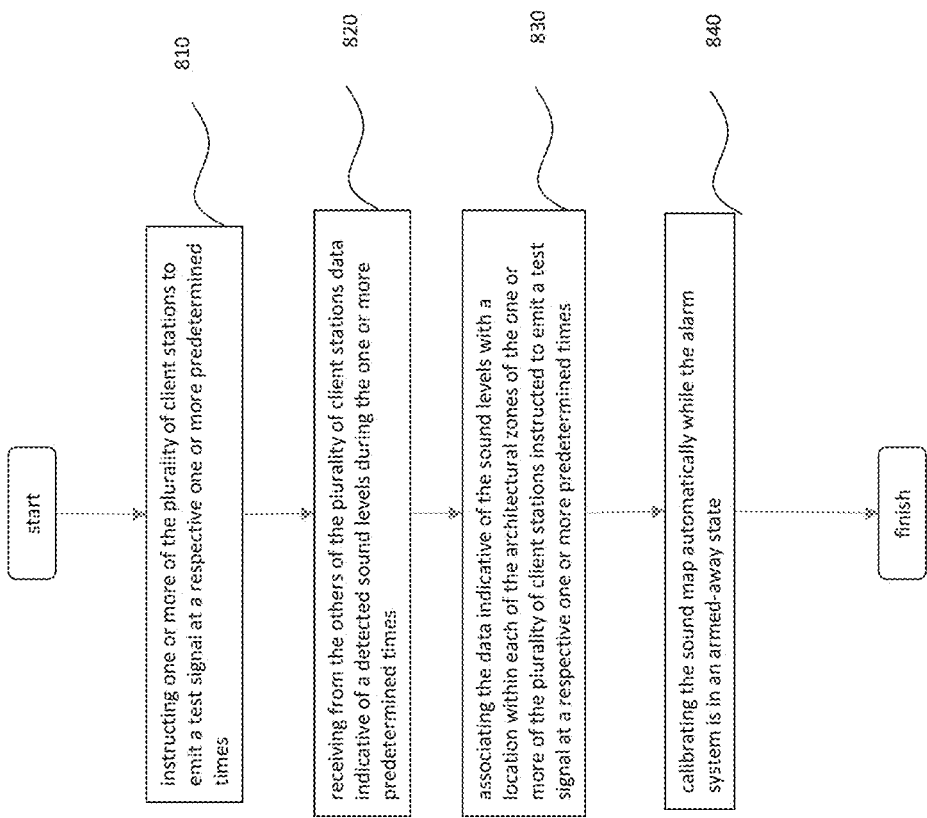
FIG. 10 is another flow chart illustrating aspects of a method of monitoring for an alarm condition according to the embodiment illustrated in FIG. 9.

FIG. 10 is a flowchart that shows a method of calibrating a sound map of an alarm system. As illustrated in bloc 810 the method includes instructing one or more of the plurality of client stations 120 to emit a test signal at a respective one or more predetermined times. As illustrated in bloc 820 the method includes receiving from the others of the plurality of client stations 120 data indicative of a detected sound levels during the one or more predetermined times. As illustrated in bloc 830 the method includes associating the data indicative of the sound levels with a location within each of the zones 140 of the one or more of the plurality of client stations 120 instructed to emit a test signal at a respective one or more predetermined times. As illustrated in bloc 830 the method includes calibrating the sound map automatically while the alarm system is in an armed-away state.

As described above, embodiments can be in the form of processor-implemented processes and devices for practicing those processes, such as a processor. Embodiments can also be in the form of computer program code containing instructions embodied in tangible media, such as network cloud storage, SD cards, flash drives, floppy diskettes, CD ROMs, hard drives, or any other computer-readable storage medium, wherein, when the computer program code is loaded into and executed by a computer, the computer becomes a device for practicing the embodiments. Embodiments can also be in the form of computer program code, for example, whether stored in a storage medium, loaded into and/or executed by a computer, or transmitted over some transmission medium, loaded into and/or executed by a computer, or transmitted over some transmission medium, such as over electrical wiring or cabling, through fiber optics, or via electromagnetic radiation, wherein, when the computer program code is loaded into an executed by a computer, the computer becomes an device for practicing the embodiments. When implemented on a general-purpose microprocessor, the computer program code segments configure the microprocessor to create specific logic circuits.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

Those of skill in the art will appreciate that various example embodiments are shown and described herein, each having certain features in the particular embodiments, but the present disclosure is not thus limited. Rather, the present disclosure can be modified to incorporate any number of variations, alterations, substitutions, combinations, sub-combinations, or equivalent arrangements not heretofore described, but which are commensurate with the scope of the present disclosure. Additionally, while various embodiments of the present disclosure have been described, it is to be understood that aspects of the present disclosure may include only some of the described embodiments. Accordingly, the present disclosure is not to be seen as limited by the foregoing description, but is only limited by the scope of the appended claims.

What is claimed is:

1. An alarm system of an installation area, comprising:
   a hub station, including:
   a hub station housing;
   a hub station controller disposed within the hub station housing,
   a plurality of client stations that are distributed in a plurality of architectural zones of the installation area, the plurality of client stations each including a client station housing and located therein a client station power transformer, a client station speaker, a client station microphone for capturing sounds including audio, a client station video display, a client station image sensor for capturing images including video, and one of a plurality of client station controllers, and
   wherein the hub station is configured for:
   monitoring the plurality of client stations over a short range telecommunications network, wherein the short range telecommunications network is a local area network or a personal area network;
   determining, from the monitoring, that an alert condition exists in a corresponding architectural zone of the architectural zones based on the capturing sounds in the corresponding architectural zone, and thereupon:
   establishing a first bidirectional communication concurrently with two or more of the plurality of client stations distributed in the plurality of architectural zones;
   establishing a second directional communication with a central station, over a long range telecommunications network that includes one or more Public Switched Telephone Networks (PTSN); and
   establishing another bidirectional communication, over a public communications network, with a mobile device,
   wherein each of the bidirectional communications include: transmitting voice and image data, representing audio captured from the corresponding microphones of the two or more of the plurality of client stations and video captured from the corresponding image sensors of the two or more of the plurality of client stations, to the central station and the mobile device; and
   receiving voice and image data, representing audio and video transmitted by the central station and the mobile device, for outputting via the corresponding client station speakers and the client video displays.

2. The system of claim 1, wherein the mobile device is a mobile phone.

3. The system of claim 1, wherein the hub station stores contact information for establishing other bidirectional communication upon determining that the alarm condition exists in the corresponding architectural zone of the architectural zones.

4. A method of monitoring for an alarm condition with an alarm system of an installation area that includes:
   a hub station that includes a hub station controller within in a hub station housing,
   a plurality of client stations that are distributed in a plurality of architectural zones of the installation area, the plurality of client stations each including a client station housing and located therein a client station power transformer, a client station speaker, a client station microphone for capturing sounds including audio, a client station video display, a client station image sensor for capturing images including video, and one of a plurality of client station controllers;
   the method comprising:
   monitoring the plurality of client stations over a short range telecommunications network, wherein the short range telecommunications network is a local area network or a personal area network;
   determining, from the monitoring, that an alert condition exists in a corresponding architectural zone of the architectural zones based on the capturing sounds in the corresponding architectural zone; and thereupon:
   establishing a first bidirectional communication over the short range telecommunications network with two or more of the plurality of client stations distributed in the plurality of architectural zones;

establishing a second directional communication with a central station, over a long range telecommunications network that includes one or more Public Switched Telephone Networks (PTSN); and establishing another bidirectional communication, over a public communications network, with a mobile device, wherein each of the bidirectional communications include: transmitting voice and image data, representing audio captured from the corresponding microphones of the two or more of the plurality of client stations and video captured from the corresponding image sensors of the two or more of the plurality of client stations, to the central station and the mobile device; and receiving voice and image data, representing audio and video transmitted by the central station and the mobile device, for outputting via the corresponding client station speakers and the client video displays.

5. The method of claim 4, comprising accessing contact information stored locally at the hub station or remotely at the central station for establishing other bidirectional communication upon determining that the alarm condition exists in the corresponding architectural zone of the architectural zones.

6. The method of claim 4, wherein the mobile device is a mobile phone.

* * * * *